(12) United States Patent
Martin et al.

(10) Patent No.: US 7,483,878 B2
(45) Date of Patent: Jan. 27, 2009

(54) GENERATION AND PRESENTATION OF SEARCH RESULTS USING ADDRESSING INFORMATION

(75) Inventors: Anthony G. Martin, Los Altos, CA (US); Eugene A. Veteska, San Jose, CA (US); David L. Goulden, Redwood City, CA (US); Christopher W. Wesley, Redwood City, CA (US)

(73) Assignee: Claria Corporation, Redwood City, CA (US)

( * ) Notice: Subject to any disclaimer, the term of this patent is extended or adjusted under 35 U.S.C. 154(b) by 950 days.

(21) Appl. No.: 10/464,418

(22) Filed: Jun. 17, 2003

(65) Prior Publication Data

US 2004/0193580 A1 Sep. 30, 2004

Related U.S. Application Data

(60) Provisional application No. 60/457,268, filed on Mar. 25, 2003.

(51) Int. Cl.
 *G06F 17/30* (2006.01)
(52) U.S. Cl. .................................. 707/3; 707/104.1
(58) Field of Classification Search .............. 707/3–9, 707/104.1
 See application file for complete search history.

(56) References Cited

U.S. PATENT DOCUMENTS

| | | | |
|---|---|---|---|
| 5,446,919 A | 8/1995 | Wilkins | |
| 5,794,259 A | 8/1998 | Kikinis | |
| 6,026,368 A | 2/2000 | Brown et al. | |
| 6,183,366 B1 | 2/2001 | Goldberg et al. | |
| 6,253,208 B1* | 6/2001 | Wittgreffe et al. | 707/104.1 |
| 6,269,361 B1 | 7/2001 | Davis et al. | |
| 6,297,819 B1 | 10/2001 | Furst | |
| 6,392,668 B1* | 5/2002 | Murray | 715/738 |
| 6,393,415 B1* | 5/2002 | Getchius et al. | 707/2 |
| 6,397,228 B1* | 5/2002 | Lamburt et al. | 707/203 |
| 6,523,021 B1* | 2/2003 | Monberg et al. | 707/2 |
| 6,601,041 B1 | 7/2003 | Brown et al. | |
| 2001/0037325 A1* | 11/2001 | Biderman et al. | 707/1 |
| 2002/0169670 A1* | 11/2002 | Barsade et al. | 705/14 |
| 2003/0088554 A1* | 5/2003 | Ryan et al. | 707/3 |
| 2003/0208472 A1* | 11/2003 | Pham | 707/2 |
| 2004/0095376 A1* | 5/2004 | Graham et al. | 345/716 |
| 2004/0167928 A1 | 8/2004 | Anderson et al. | |
| 2004/0181525 A1* | 9/2004 | Itzhak et al. | 707/5 |

FOREIGN PATENT DOCUMENTS

WO WO 01/90917 A2 11/2001

OTHER PUBLICATIONS

SideStep, The Traveler's Search Engine; Webpage [online] [retrived on Oct. 7, 2004]; retrieved from the internet: <URL:http://www.sidestep.com/main.html.

(Continued)

*Primary Examiner*—Don Wong
*Assistant Examiner*—Hanh B Thai
(74) *Attorney, Agent, or Firm*—Sheppard, Mullin, Richter & Hampton LLP

(57) ABSTRACT

In one embodiment, addressing information identifying a location in a computer network is received in a computer. The location may be a website or a specific web page of a website on the Internet, for example. A keyword may be determined based on the addressing information. A search may be performed on the keyword to obtain a search result, which may be displayed in a presentation vehicle such as a pop-under, for example.

15 Claims, 6 Drawing Sheets

OTHER PUBLICATIONS

Visual Search ToolBar—Graphically Enhance Search Results, 2004 Viewpoint Corporation; Webpage [online] [retrieved on Oct. 7, 2004]; retrieved from the internet: <URL:http://www.viewpoint.com/pub/toolbar/download.html.

Shopping with WhenUShop, Webpage [on-line]; WhenU.com [retrieved on Mar. 19, 2002]. Retrieved from the internet: URL:http://www.whenu.com.

* cited by examiner

GENERATION AND PRESENTATION OF SEARCH RESULTS USING ADDRESSING INFORMATION

CROSS-REFERENCE TO RELATED APPLICATION

This application claims the benefit of U.S. Provisional Application No. 60/457,268, entitled "GENERATION AND PRESENTATION OF SEARCH RESULTS USING ADDRESSING INFORMATION", filed by Anthony G. Martin, Eugene A. Veteska, and David L. Goulden on Mar. 25, 2003.

BACKGROUND OF THE INVENTION

1. Field Of The Invention

The present invention relates generally to computer systems, and more particularly but not exclusively to methods and associated systems for generating and presenting search results in a computer network.

2. Description Of The Background Art

Use of the Internet for making commercial transactions has become commonplace and continues to grow. Due to the magnitude and variety of websites offering goods and services over the Internet—and information relating to goods and services—using the Internet as a means for pursuing commercial opportunities can be inefficient. For example, an end-user searching for special offers, discounts, and new products over the Internet may be overwhelmed with irrelevant advertisements. These advertisements are typically provided by server computers having no intelligence as to the interests of the end-user. Thus, most advertisements displayed to the end-user are irrelevant to the end-user, and only of fortuitous interest to the end-user. Also, these advertisements are often times displayed separately, thus cluttering the end-user's computer screen.

SUMMARY

In one embodiment, addressing information identifying a location in a computer network is received in a computer. The location may be a website or a specific web page of a website on the Internet, for example. A keyword may be determined based on the addressing information. A search may be performed on the keyword to obtain a search result, which may be displayed in a presentation vehicle such as a pop-under, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided such as examples of systems, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

It is to be noted that although embodiments of the present invention are described herein in the context of delivering and receiving advertisements over the Internet, the present invention is not so limited and may be used in other data processing applications.

An end-user navigating on the Internet may encounter a variety of messages, such as advertisements displayed in pop-unders, pop-ups, banners, and other types of presentation vehicles. However, unless they specifically target the needs of the end-user, these messages will largely go unnoticed. Also, delivery of most messages on the Internet is somewhat limited as it relies on server-side technology, thus requiring the end-user to be on a specific website to receive the message. This requires an advertiser to contract with multiple websites in order to obtain a large audience. In addition, most of these messages are individually delivered to the end-user, thus cluttering the end-user's computer screen.

Embodiments of the present invention alleviate the aforementioned problems associated with conventional message delivery by generating search results based on addressing information. In one embodiment, a client program resident in a client computer monitors an end-user's web browsing activity. The client program may be configured to trigger delivery of search results to the client computer when the end-user goes to a website in a category of websites. The search results may be responsive to one or more keywords derived from addressing information, such as the uniform resource locator (URL) of a website visited by the end-user.

By employing a client program, search results may be delivered to the end-user across a category of websites instead of from one particular website. That is, the client program (as opposed to a server program) is operable to trigger reception of messages across different websites. In addition, by performing a search on a keyword derived from addressing information, which is entered by the end-user, the probability that the end-user would have an interest in the search results is advantageously increased. Furthermore, using a search result format advantageously allows for several advertisements and other information to be displayed in a single presentation vehicle, thus minimizing clutter on the end-user's computer screen.

Figure 1:
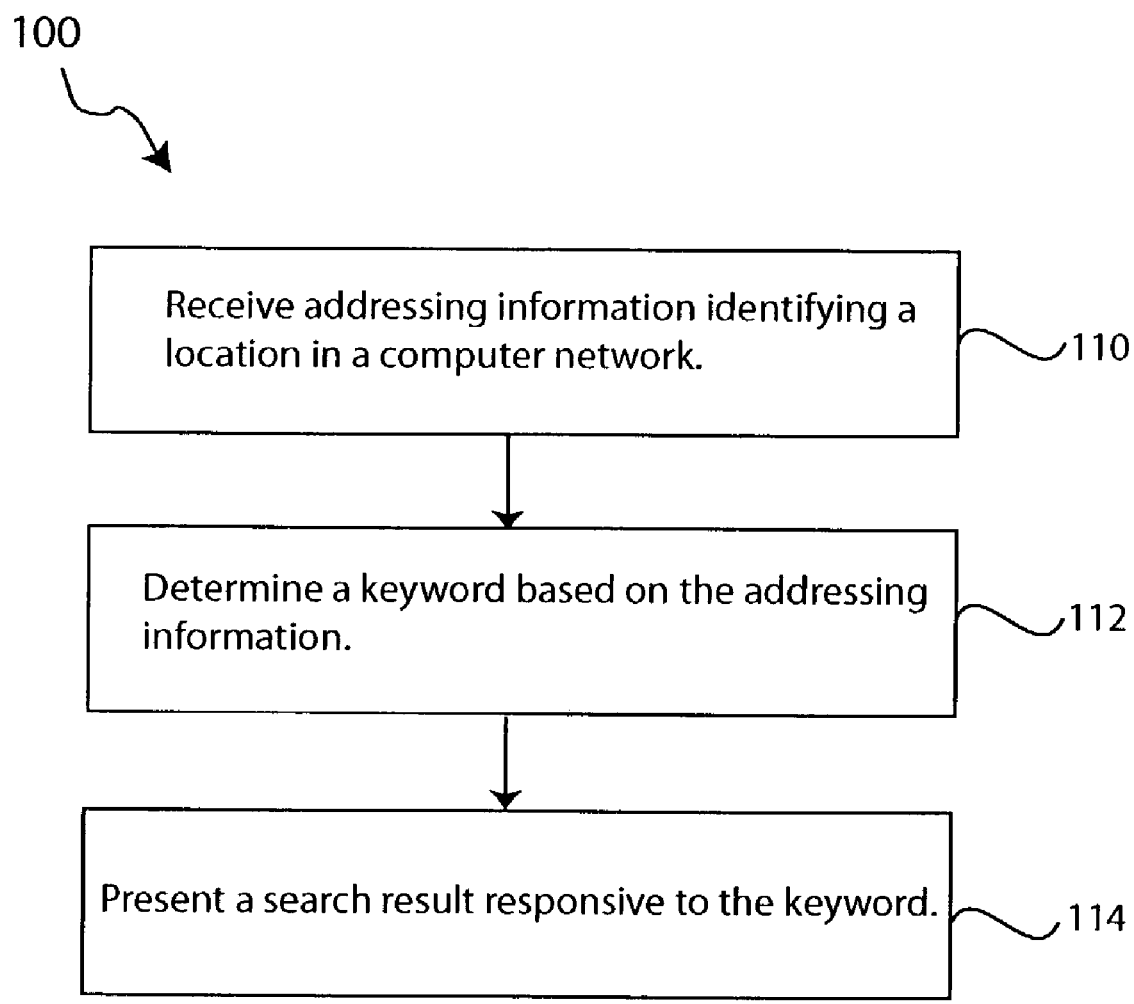
FIG. 1 shows a flow diagram illustrating a method of providing a search result in accordance with an embodiment of the present invention.

Referring now to FIG. 1, there is shown a flow diagram illustrating a method 100 of providing a search result in accordance with an embodiment of the present invention. In step 110, a client program receives addressing information identifying a location in a computer network. The location may be a website or a specific web page of the website visited by the end-user on the Internet. The addressing information may comprise a URL identifying the website or specific web pages of the website. The client program may receive the URL as an event notification from a web browser employed by the end-user, for example. For purposes of the present disclosure, the terms "website" and "web page" may be interchangeably used when referring to a specific location on the Internet.

In step 112, a keyword based on the addressing information is determined. In one embodiment, websites are categorized and then assigned one or more keywords. For example, websites relating to computers may be assigned the keyword "computer". Specific web pages of a website may also be assigned more particular keywords. For example, the printer section of a computer-related website may be assigned the keywords "computer" and "printer", or the phrase "computer printer". A human operator may thus categorize popular websites on the Internet, assign a keyword for each category of websites, and enter the URL of the categorized websites along with their respective keywords in a database. The database may be a commercially available database program, a spreadsheet, a text file, or some other data storage and retrieval mechanism.

Determining the keyword (or keywords) assigned to each category of websites may be performed by the client program, or a server program in communication with the client program. For example, the client program may obtain the URL of a website visited by the end-user, and then provide the URL to the server program. The server program may then consult a database to determine at least one keyword assigned to the URL. The client program may also consult a local (i.e., resident in the client computer) database to determine at least one keyword assigned to the URL.

In step 114, the client program presents the end-user a search result responsive to the keyword determined in step 112. For example, the keyword may be provided to a search engine that can perform a search on the keyword. The search result may be posted by the search engine on a designated web page. In the client computer, the client program may create or initiate the creation of a window (e.g., another browser window) pointed to the designated web page. This allows the end-user to view the search results.

Techniques for providing search results to end-users are also disclosed in commonly-assigned U.S. application Ser. No. 10/289,123, entitled "RESPONDING TO END-USER REQUEST FOR INFORMATION IN A COMPUTER NETWORK," filed on Nov. 5, 2002, by Eugene A. Veteska, David L. Goulden, and Anthony G. Martin, which is hereby incorporated by reference in its entirety. After a keyword has been derived from addressing information, a search result may also be obtained using techniques similar to those disclosed in the just mentioned U.S. application.

Figure 2:
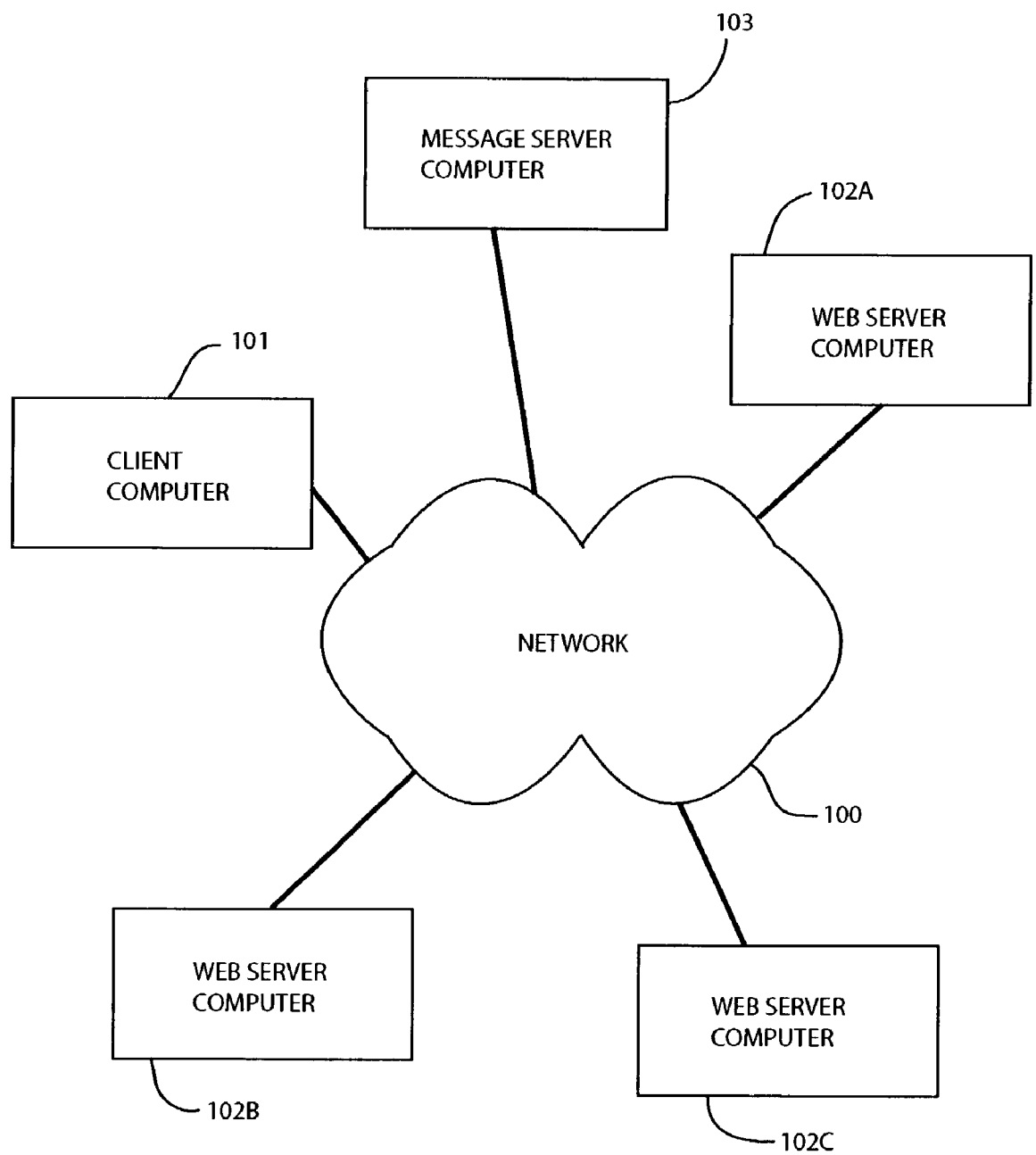
FIG. 2 shows a schematic diagram of a computer network in accordance with an embodiment of the present invention.

Referring now to FIG. 2, there is shown a schematic diagram of a computer network 100 in accordance with an embodiment of the present invention. Network 100 may include one or more client computers 101, one or more web server computers 102 (i.e., 102A, 102B, . . . ), one or more message server computers 103, and other computers not shown. Intermediate nodes such as gateways, routers, bridges, Internet service provider networks, public-switched telephone networks, proxy servers, firewalls, and other network components are not shown for clarity. In the example of FIG. 2, network 100 includes the Internet; however, other types of computer networks may also be used. Computers may be coupled to network 100 using any type of connection without detracting from the merits of the present invention.

A client computer 101 is typically, but not necessarily, a personal computer such as those running the Microsoft Windows™, Apple Macintosh™, Linux, or UNIX operating systems. An end-user may employ a suitably equipped client computer 101 to get on network 100 and access computers coupled thereto. For example, a client computer 101 may be used to access web pages from a web server computer 102. It is to be noted that as used in the present disclosure, the term "computer" includes any type of data processing device including personal digital assistants, digital telephones, wireless terminals, video game consoles, and the like.

A web server computer 102 may be a website containing information designed to attract end-users surfing on the Internet. A web server computer 102 may also include advertisements, downloadable computer programs, and products available for online purchase. A web server computer 102 may also be an ad server for delivering advertisements to a client computer 101. A web server computer 102 may include a search engine for making a local search (i.e., within a domain) or an Internet search.

A message server computer 103 may include the functionalities of a web server computer 102. Additionally, in one embodiment, a message server computer 103 may also include message units for delivery to a client computer 101. The message units, which are further described below, may contain advertisements, for example. A message server computer 103 may also include downloadable computer programs and files for supporting, updating, or maintaining components in a client computer 101.

Web server computers 102 and message server computers 103 are typically, but not necessarily, server computers such as those available from Sun Microsystems, Hewlett-Packard, or International Business Machines. A client computer 101 may communicate with a web server computer 102 or a message server computer 103 using client-server protocol. It is to be noted that client-server computing is well known in the art and will not be further described here. It is to be further noted that for purposes of the present disclosure, a computer may be a single computer or a network of computers (e.g., a distributed computer system).

Figure 3:
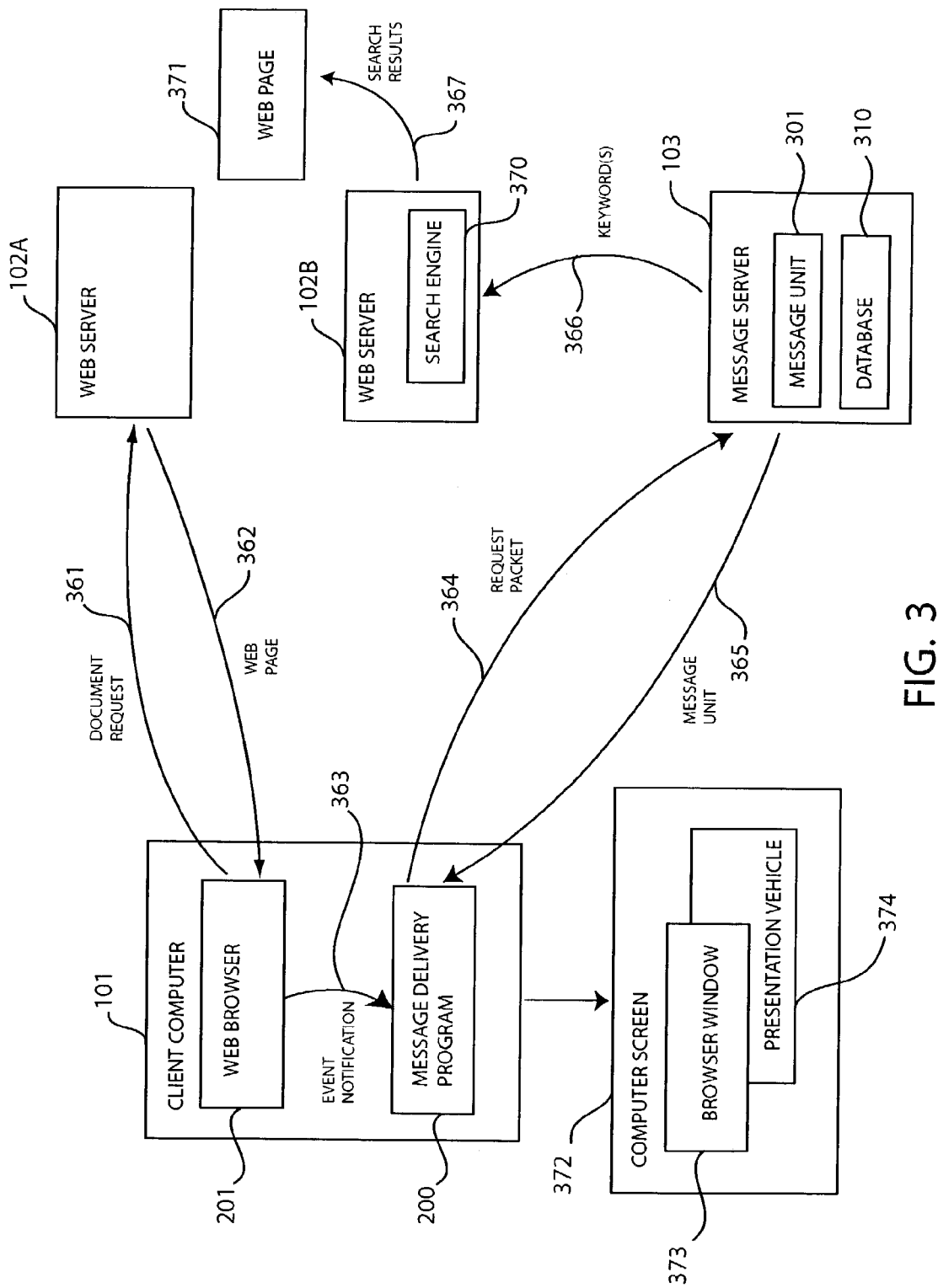
FIG. 3 shows a flow diagram schematically illustrating generation and presentation of search results in accordance with an embodiment of the present invention.

FIG. 3 shows a flow diagram schematically illustrating generation and presentation of search results using addressing information, in accordance with an embodiment of the present invention. As indicated by an arrow 361, a web browser 201 may provide a document request to a web server computer 102A. In the example of FIG. 3, the document request is a request to receive a web page. However, the document request may also be a request to receive a program, a file, a connection, or other types of information, data, or service accessible over a computer network such as the Internet. In response to the document request, web server computer 102A may provide the requested web page to client computer 101 (see arrow 362). Web browser 201 may display the requested web page in a browser window 373 displayed in a computer screen 372 of client computer 101.

A message delivery program 200 may monitor an end-user's browsing activity by listening for addressing information from web browser 201. For example, message delivery program 200 may receive an event notification (see arrow 363) from web browser 201 every time the end-user navigates, such as when the user navigates from one website to another website, or to specific web pages of a website. An event notification may include addressing information, such as a URL. Thus, message delivery program 200 receives from web browser 201 the URL of the web page requested from web server computer 102A. As can be appreciated, the mechanics of monitoring an end-user's browsing activity, such as determining where an end-user is navigating to, what an end-user is typing on a web page, when an end-user activates a mouse or keyboard, and the like, is, in general, known in the art.

Upon receipt of a URL from web browser 201, message delivery program 200 may send a request packet to message server computer 103 (see arrow 364). The request packet my include the URL, thus identifying to message server computer 103 where the end-user just navigated. For example, if the end-user received a web page from "travellingtoday.com", a fictitious travel-related website, message server computer 103 may receive the URL "http://www.travellingtoday.com" in the request packet.

As shown in FIG. 3, message server computer 103 may include one or more message units 301 and a database 310. Database 310 may keep track of message units 301 intended for websites belonging to a certain category of websites. For example, a message unit 301A (a specific embodiment of a message unit 301). may be designated for travel-related websites, such as "travellingtoday.com", "cruiseandsnooze.com", "faroffandaway.com", and other websites. Thus, when a request packet indicates that the end-user is viewing a particular web page of "travellingtoday.com", message server computer 103 may consult database 310 for any message units 301 intended for "travellingtoday.com", which in this example is message unit 301A. Message server computer 103 may then provide message unit 301A to client computer 101 (see arrow 365).

Message server computer 103 may also consult database 310 for one or more keywords associated with the URL included in a received packet. For example, if a request packet indicates that the end-user is viewing a web page of "travellingtoday.com" and the keyword "travel" has been assigned to travel-related websites like "travellingtoday.com", a search may be performed on the keyword "travel". The search may be performed by a search engine resident in message server computer 103, in another server computer working with message server computer 103, or in a web server computer accessible over the Internet. In the example of FIG. 3, the keyword is provided to a web server computer 102B accessible over the Internet (arrow 366). Web server computer 102B may be operated by one business entity, while message server computer 103 may be operated by another business entity. This advantageously allows for revenue sharing for each search results provided to the end-user. For example, search results provided to the end-user may contain paid advertisements. The revenue from the paid advertisement may be shared between the operator of message server computer 103, operator of web server computer 102B, and provider of message delivery program 200.

As shown in FIG. 3, web server computer 102B may include a search engine 370 for performing an Internet search or a local search. As can be appreciated, search engine 370 may also be a database containing a predetermined list of advertisements and information. For example, search engine 370 may be a database containing a predetermined list of hyperlinks to travel-related websites, which may or may not be in competition to the travel-related website the end-user just visited ("travellingtoday.com" in this example). A search engine 370 comprising a database containing a predetermined list of advertisements and information may also be resident in message server computer 103, or client computer 101 depending on the size of the search engine. The location and functionalities of a search engine may be varied from description provided herein without detracting from the merits of the present invention.

In the example of FIG. 3, search engine 370 performs a search on the keyword provided by message server computer 103, and posts the search results in a web page 371 (see arrow 367). Web page 371 may be resident in a web server accessible over the Internet, such as web server computer 102B or message server computer 103, for example. The address of web page 371 may be included in a corresponding message unit (message unit 301A in the travel-related website example) provided to client computer 101. A presentation vehicle 374 displayed in computer screen 372 may thus be pointed to web page 371 to display the search results. In one embodiment, presentation vehicle 374 comprises a browser window displayed under browser window 373. That is, presentation vehicle 374 may be a pop-under. As can be appreciated, the search results may also be integrated in browser window 373 (e.g., displayed in a side panel of browser window 373), or displayed in other types of presentation vehicles.

Figure 4:
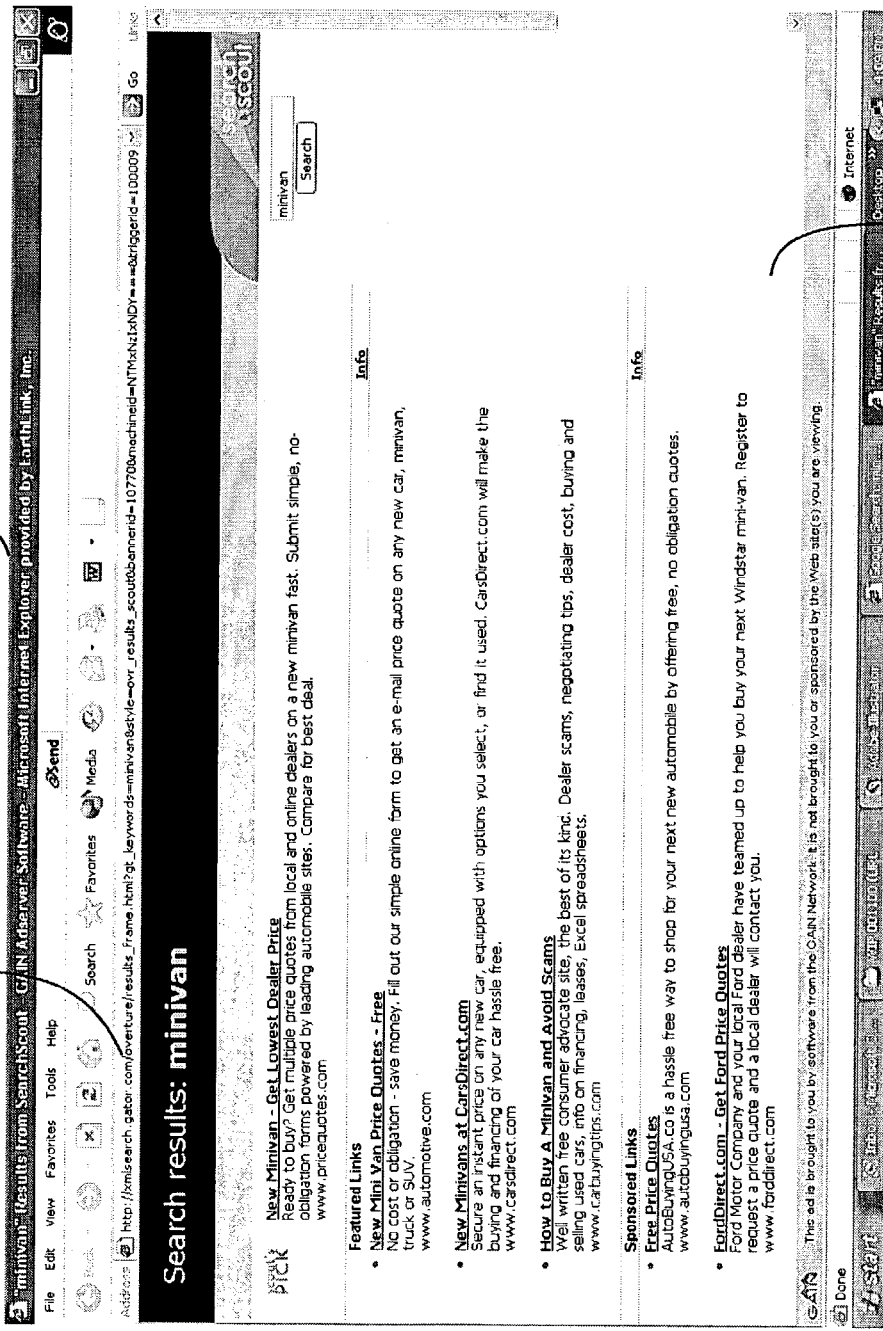
FIG. 4 shows a presentation vehicle for displaying search results in accordance with an embodiment of the present invention.

FIG. 4 shows a presentation vehicle 374A for displaying search results 401 in accordance with an embodiment of the present invention. Presentation vehicle 374A is a specific embodiment of presentation vehicle 374 shown in FIG. 3. Presentation vehicle 374A may be a browser window displayed as a pop-under. In the example of FIG. 4, presentation vehicle 374A is pointed to a URL 402 of a web page containing search results for the keyword "minivan". Presentation vehicle 374A and the displayed search results 401 may be in response to the end-user navigating to the minivan web page of the fictitious domain "cars.com", for example.

Figure 5:
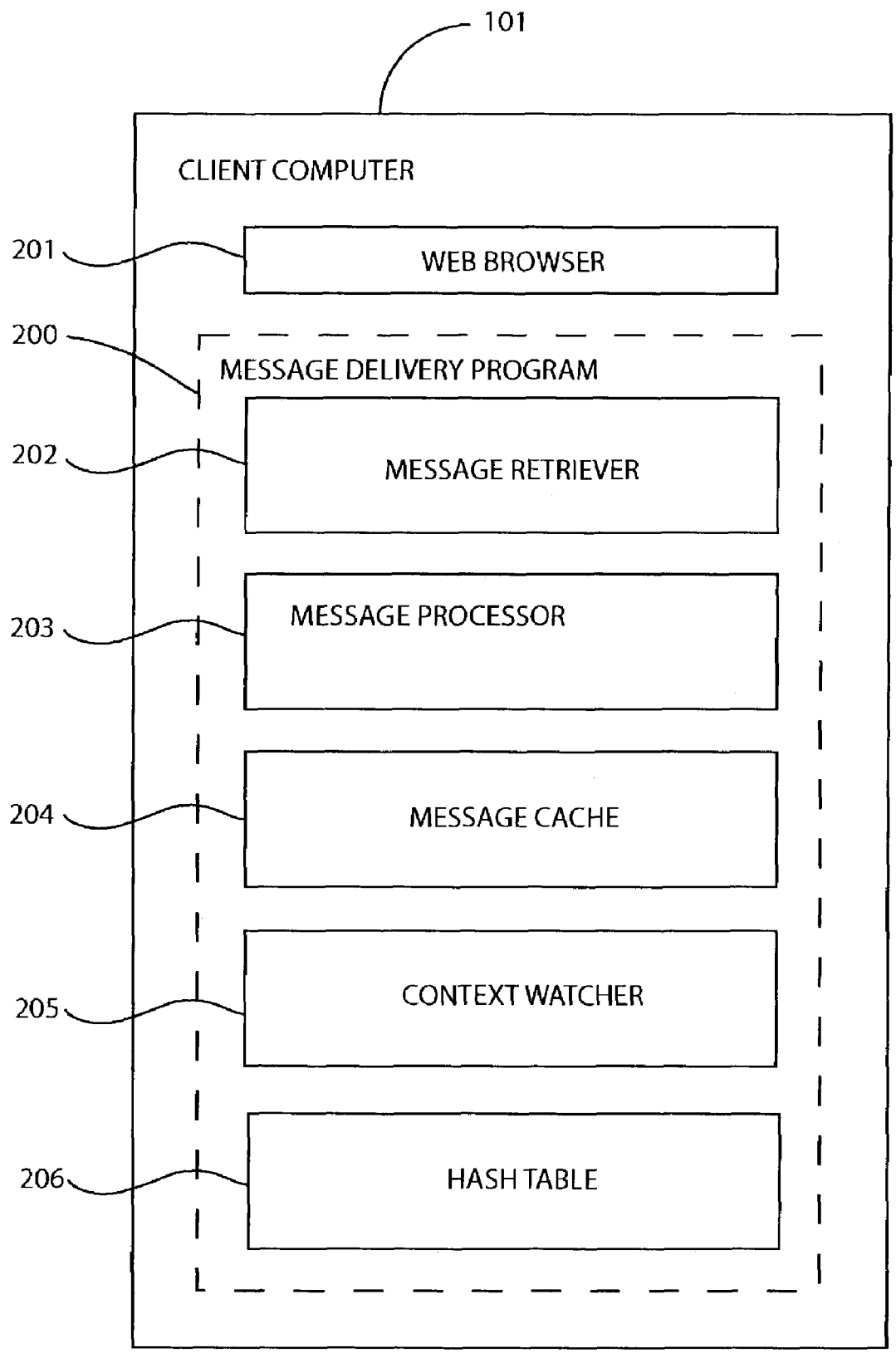
FIG. 5 schematically illustrates the components of a client computer in accordance with an embodiment of the present invention.

FIG. 5 schematically illustrates the components of a client computer 101 in accordance with an embodiment of the present invention. In one embodiment, the components of client computer 101 shown in FIG. 5 are implemented in software. It should be understood, however, that components in the present disclosure may be implemented in hardware, software, or a combination of hardware and software (e.g., firmware). Software components may be in the form of computer-readable program code stored in a computer-readable storage medium such as random access memory (RAM), mass storage device (e.g., local hard disk drive or remote hard disk drive accessible over the Internet), or removable storage device (e.g., optical storage device such as a CD-ROM or DVD). For example, a computer-readable storage medium may comprise computer-readable code for performing the function of a particular component. Likewise, computer memory may be configured to include one or more components, which may then be run by a microprocessor. Components may be implemented separately in multiple modules or together in a single module.

As shown in FIG. 5, client computer 101 may include a web browser 201 and a message delivery program 200. Web browser 201 may be a commercially available web browser or web client running on a client computer 101. In one embodiment, web browser 201 is the Microsoft Internet Explorer™ web browser.

In one embodiment, message delivery program 200 is downloadable from a message server computer 103. Message delivery program 200 may be downloaded in conjunction with the downloading of another computer program. For example, message delivery program 200 may be downloaded to a client computer 101 along with a utility program that is provided free of charge or at a reduced cost. The utility program may be provided to an end-user in exchange for the right to deliver messages to the end-user via message delivery program 200. In essence, revenue (e.g., advertising fees) from messages delivered to the end-user may help defray the cost of creating and maintaining the utility program.

Message delivery program 200 may include a message retriever 202, a message processor 203, a message cache 204, a context watcher 205, and a hash table 206. Other components such as operating system components, utility programs, application programs, and the like are not shown for clarity of illustration.

Message retriever 202 may include computer-readable program code for requesting message units from message server computer 103. As will be explained later on in connection with FIG. 6, a message unit may include a message content. A message content may include, without limitation, information to be displayed on a computer screen, audio to be played, or computer-readable program code (e.g., Java applet, script, HTML, hyperlink, pointer to a web page containing search results). Message units are processed according to their message contents. For example, a message unit containing displayable message content is processed by displaying its message content on a computer screen, a message unit whose message content includes computer-readable program code is processed by running its message content, and so on.

Still referring to FIG. 5, message retriever 202 monitors web browser 201 for the uniform resource locator (URL) of websites visited by an end-user navigating on the Internet. For each website visited by an end-user, message retriever 202 may send a request packet to message server computer 103. In one embodiment, a request packet includes:

(a) the end-user's unique identification (ID) number;
(b) the ID number of client computer 101;
(c) the local time;
(d) the domain name of the website visited by the end-user; and
(e) a list of message units stored in message cache 204.

In one embodiment, personal information such as the actual name of the end-user, credit card information, residence address, and the like is stored solely in client computer 101 to protect the end-user's privacy.

Message server computer 103 checks if there is a corresponding message unit for each request packet received from client computer 101. If so, message server computer 103 sends the corresponding message unit to client computer 101. For example, message retriever 202 may send a request packet to message server computer 103 as an end-user navigates from "travellingtoday.com" to "cars.com." If a message unit is available for the domain "cars.com", message server computer 103 will send that message unit to client computer 101. Message units received in client computer 101 are stored in message cache 204.

Client computer 101 may also include a hash table 206. Hash table 206 may contain information for determining whether a message unit is available for a particular domain. This allows message retriever 202 to first query hash table 206 before sending a request packet to message server computer.103. If hash table 206 indicates that there is a message unit for a domain visited by the end-user, message retriever 202 may proceed to send a request packet to message server computer 103. Otherwise, message retriever 202 may not send a request packet, thereby minimizing the amount of request packets sent to and processed by message server computer 103.

Message processor 203 may include computer-readable program code for processing a message unit. Message processor 203 may process a message unit by displaying its message content. Message processor 203 may display a message content using a variety of presentation vehicles including pop-ups, pop-unders, banners, message boxes, text boxes, sliders, separate windows, windows embedded in a web page, and other mechanisms for displaying information. Message processor 203 may also process a message unit by playing its message content if the message content is audio or video, or by running its message content if the message content is computer-readable program code. Message processor 203 may process a message unit by displaying a pop-under (or other presentation vehicle) pointed to a web page containing search results. Specifically, message processor 203 may request web browser 201 to open a new browser window to display the web page containing the search results.

Context watcher 205 may include computer-readable program code for determining if a message unit has been triggered for processing. Context watcher 205 checks message cache 204 for message units whose rules have been satisfied. If context watcher 205 finds such a message unit, context watcher 205 alerts message processor 203 to process the message unit. Rules for processing message units are further described with reference to FIG. 6.

Figure 6:
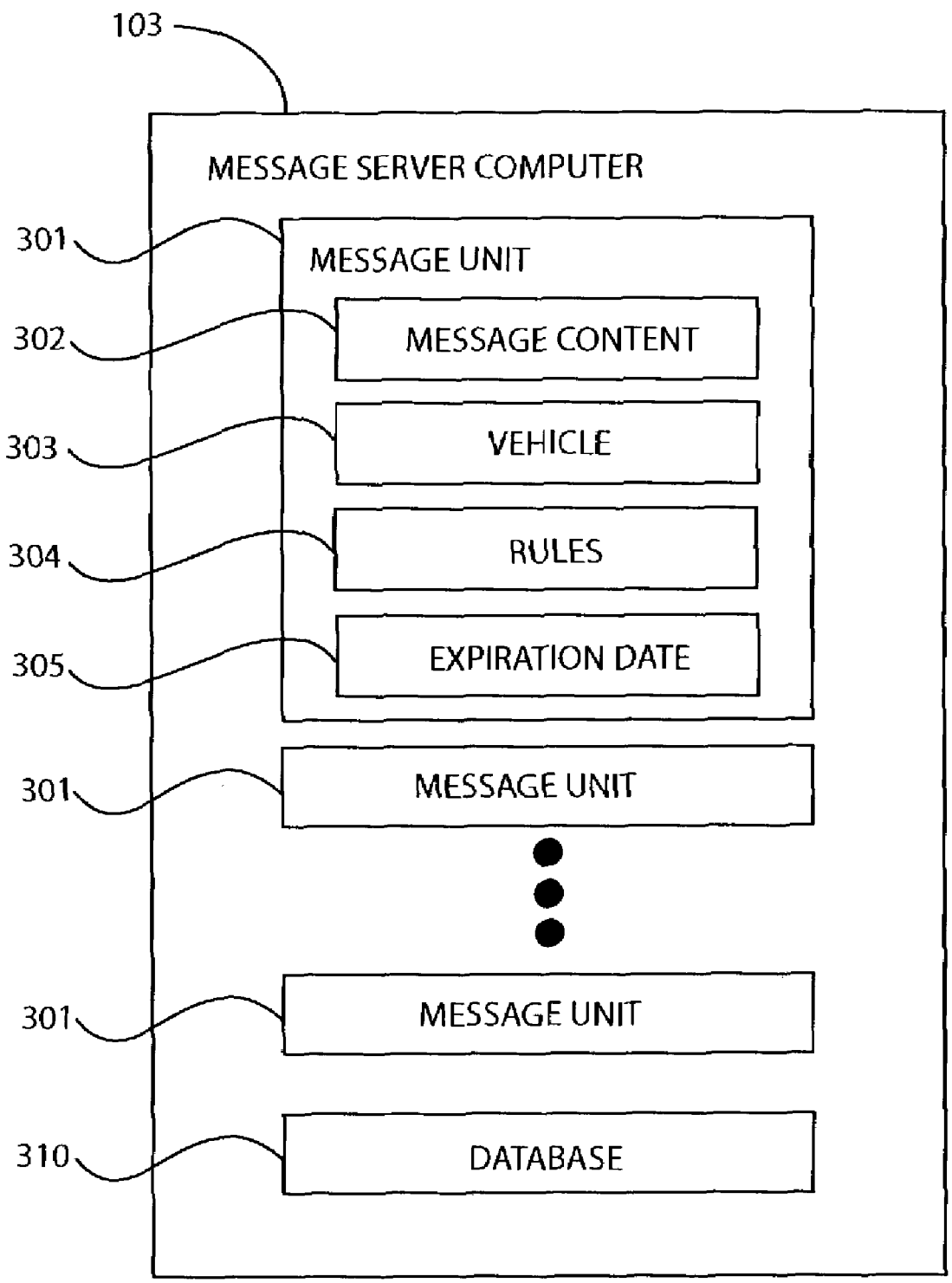
FIG. 6 schematically illustrates the components of a message server computer in accordance with an embodiment of the present invention.

FIG. 6 schematically illustrates the components of a message server computer 103 in accordance with an embodiment of the present invention. As mentioned, message server computer 103 receives request packets from a client computer 101. Each received request packet may include the domain name of the website visited by an end-user. Message server computer 103 uses the domain name to find all message units available for that website. For example, a message unit may contain an advertisement for a car company that wants to display its advertisement to end-users visiting car-related websites, such as "cars.com". When a request packet indicates that an end-user is on "cars.com", the message unit containing the car company's advertisement will be sent to the requesting client computer 101.

A message server computer 103 may include one or more message units 301 and a database 310. Database 310 may be a commercially available database program. Database 310 may be employed to keep track of message units 301. For example, message server computer 103 may query database 310 for all message units 301 available for a particular website.

A message unit 301 may include a message content 302, a vehicle 303, rules 304, and an expiration date 305. Message content 302 may include computer-readable program code, text, images, audio, video, hyperlink, and other information. A message content 302 may be an advertisement, or a pointer to a web page designated to contain search results, for example.

Vehicle 303 indicates the presentation vehicle to be used in presenting message content 302 to an end-user. For example, vehicle 303 may call for the use of a pop-up, pop-under, banner, message box, text box, slider, separate window, window embedded in a web page, and the like A message unit 301 may include rules 304 for specifying the conditions that need to be satisfied before the message unit is triggered for processing. Rules 304 may specify to display a message content 302 when an end-user navigates to a specific web page or as soon as the message unit 301 is received in a client computer 101. For example, a car company may contract with the operator of a message server computer 103 to deliver a message unit 301B containing an advertisement for a minivan (message unit 301B is a specific embodiment of a message unit 301). The rules 304 of message unit 301B may specify that the minivan advertisement is to be displayed to end-users viewing the minivan web page of "cars.com". In this example, the minivan web page of cars.com has the URL "www.cars.com/minivans". When an end-user visits the main page (or any web page) of "cars.com", message retriever 202 (see FIG. 5) will send a request packet to message server computer 103 indicating that the end-user is on "cars.com". In response, message server computer 103 will send message unit 301B to client computer 101. When the end-user navigates to the URL "www.cars.com/minivans", context watcher 205 will detect that the minivan message unit has been triggered for display (i.e., rules 304 of message unit 301B have been satisfied). Context watcher 205 will accordingly inform message processor 203, which will then process message unit 301B by displaying (or initiating the display of) its message content.

In the above described minivan example, message unit 301B may also be commissioned by a search engine that accepts paid advertising for inclusion in search results. Accordingly, the message content of message unit 301B may be a pointer to a web page designated to contain search results for the keyword "minivan". Thus, when an end-user navigates to "www.cars.com/minivans", search results for the keyword "minivan" from the commissioning search engine may be displayed in a pop-under pointed to the designated web page.

Rules 304 may also include: (a) a list of domain names at which the content of a message unit 301 is to be displayed, (b) URL sub-strings that will trigger displaying of the content of the message unit 301, and (b) time and date information. As can be appreciated, rules 304 may also be extended to take into account additional information relating to an end-user (as identified by a corresponding end-user ID) such as the end-user's frequent flyer affiliation, club memberships, type of credit card used, hobbies and interests, and basic demographic information. End-user related information may be stored in client computer 101 or database 310 of message server computer 103. End-user related information may be used for targeted advertising purposes, for example.

As shown in FIG. 6, a message unit 301 may also include an expiration date 305. Expiration date 305 indicates the latest date and time the message unit 301 can still be processed. Expired message units 301 do not have to be processed and may be removed from client computer 101.

Other techniques for receiving and processing message units are also described in the following commonly-assigned disclosure, which is incorporated herein by reference in its entirety: U.S. application Ser. No. 10/152,204, filed on May 21, 2002, by Scott G. Eagle, David L. Goulden, Anthony G. Martin, and Eugene A. Veteska.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method of providing search results to an end-user over a computer network, the method comprising:

receiving addressing information identifying a location in a computer network;

processing the addressing information to generate a keyword;

performing a search on the keyword to generate a search result; and presenting an end-user the search result responsive to the keyword that is based on the addressing information in response to the end-user navigating to the location using a client computer.

2. The method of claim 1 wherein the addressing information comprises a uniform resource locator (URL).

3. The method of claim 1 wherein the location comprises a website on the Internet.

4. The method of claim 3 wherein presenting the search result comprises displaying the search result in a pop-under displayed under a browser window that is displaying a web page served by the website to the client computer.

5. The method of claim 1 wherein the computer network includes the Internet.

6. The method of claim 1 wherein the keyword is associated with a category of websites.

7. The method of claim 1 wherein the keyword is determined by consulting a database.

8. The method of claim 1 wherein the method is performed by a client computer coupled to the Internet.

9. A computer-readable storage medium comprising:

computer-readable program code for receiving addressing information identifying a website on the Internet;

computer-readable program code for processing the addressing information to generate a keyword;

computer-readable program code for performing a search on the keyword to generate a search result; and computer-readable program code for presenting an end-user the search result responsive to the keyword that is based on the addressing information when the end-user navigates to the website using a client computer.

10. The computer-readable storage medium of claim 9 wherein the computer-readable storage medium comprises random access memory (RAM).

11. The computer-readable storage medium of claim 9 wherein the computer-readable storage medium comprises a removable storage device.

12. The computer-readable storage medium of claim 9 wherein the computer-readable storage medium comprises a mass storage device accessible over the Internet.

13. The computer-readable storage medium of claim 9 wherein the search result is to be displayed in a pop-under displayed under a browser window that is displaying a web page served by the website.

14. The computer-readable storage medium of claim 9 wherein the search result is to be integrated in a browser window along with a content from a web page.

15. The computer-readable storage medium of claim 9 wherein the search result comprises a list of predetermined advertisements.

* * * * *